United States Patent
Yoshida et al.

(10) Patent No.: US 9,448,462 B2
(45) Date of Patent: Sep. 20, 2016

(54) PULSE WIDTH MODULATION CONTROL OF SOLENOID MOTOR

(71) Applicant: Raytheon Company, Waltham, MA (US)

(72) Inventors: Amy M. Yoshida, Goleta, CA (US); Thomas J. Kostrzewa, Goleta, CA (US); Eric T. Hughes, Santa Barbara, CA (US); Michael L. Brest, Goleta, CA (US); Eric J. Griffin, Ranchos Palos Verdes, CA (US); Jerry Hershberg, Torrance, CA (US)

(73) Assignee: Raytheon Company, Waltham, MA (US)

( * ) Notice: Subject to any disclaimer, the term of this patent is extended or adjusted under 35 U.S.C. 154(b) by 37 days.

(21) Appl. No.: 14/170,276

(22) Filed: Jan. 31, 2014

(65) Prior Publication Data

US 2014/0361713 A1    Dec. 11, 2014

Related U.S. Application Data

(63) Continuation-in-part of application No. 14/091,128, filed on Nov. 26, 2013, which is a continuation-in-part of application No. 14/088,176, filed on Nov. 22, 2013.

(60) Provisional application No. 61/833,592, filed on Jun. 11, 2013, provisional application No. 61/833,599, filed on Jun. 11, 2013, provisional application No. 61/833,587, filed on Jun. 11, 2013.

(51) Int. Cl.
*G03B 9/08* (2006.01)

(52) U.S. Cl.
CPC ............... *G03B 9/08* (2013.01); *H02P 25/032* (2016.02); *H02P 25/034* (2016.02)

(58) Field of Classification Search
USPC .......................................................... 396/452
See application file for complete search history.

(56) References Cited

U.S. PATENT DOCUMENTS

| 3,082,674 A | 3/1963 | Bagby |
| 3,699,863 A | 10/1972 | Yamamoto |

(Continued)

FOREIGN PATENT DOCUMENTS

| EP | 2416216 A1 | 2/2012 |
| GB | 2446606 A | 8/2008 |

(Continued)

OTHER PUBLICATIONS

United States Office Action dated Aug. 18, 2014 in connection with U.S. Appl. No. 14/091,128; 14 pages.

(Continued)

*Primary Examiner* — David Gray
*Assistant Examiner* — Dennis Hancock

(57) ABSTRACT

A drive mechanism configured to drive a thermally isolated actuator between two positions. The drive mechanism includes a rotary actuated motor configured to rotatably drive a motor member, and a drive member coupled to the motor member and having a drive arm configured to responsively move from a first position to a second position upon rotation of the motor member. An actuator is responsive to movement of the drive arm moved from the first position to the second position. A drive circuit is configured to generate a pulse width modulated (PWM) drive signal configured to controllably drive the motor, the PWM drive signal having a first duty cycle configured to advance the drive arm from the first position, and having a second duty cycle different than the first duty cycle as the drive arm approaches the second position. The drive signal may be removed before the drive arm engages a hard stop. The drive mechanism may comprise at least one sensor configured to determine a position of the drive arm proximate the first position and proximate the second position. The actuator is thermally isolated from the drive arm in both the first position and the second position.

24 Claims, 13 Drawing Sheets

(56) References Cited

U.S. PATENT DOCUMENTS

| | | | |
|---|---|---|---|
| 3,938,168 A | | 2/1976 | Lange |
| 4,121,235 A | | 10/1978 | Fujita et al. |
| 4,592,083 A | | 5/1986 | O'Brien |
| 4,995,700 A | | 2/1991 | Barney et al. |
| 5,128,796 A | | 7/1992 | Barney et al. |
| 5,402,202 A | * | 3/1995 | Washisu et al. .............. 396/235 |
| 5,689,746 A | | 11/1997 | Akada et al. |
| 5,775,276 A | | 7/1998 | Yanai et al. |
| 5,991,143 A | | 11/1999 | Wright et al. |
| 6,128,175 A | | 10/2000 | Wright et al. |
| 6,133,569 A | | 10/2000 | Shoda et al. |
| 6,285,151 B1 | | 9/2001 | Wright et al. |
| 6,366,441 B1 | | 4/2002 | Ozawa et al. |
| 6,423,419 B1 | | 7/2002 | Teer et al. |
| 6,515,285 B1 | | 2/2003 | Marshall et al. |
| 6,995,359 B1 | | 2/2006 | Hillenbrand et al. |
| 7,410,310 B2 | | 8/2008 | Kihara |
| 8,164,813 B1 | | 4/2012 | Gat et al. |
| 8,911,163 B1 | | 12/2014 | Yanevich et al. |
| 2002/0030163 A1 | | 3/2002 | Zhang |
| 2004/0238741 A1 | | 12/2004 | Gat et al. |
| 2005/0035870 A1 | | 2/2005 | Bauerle et al. |
| 2006/0255275 A1 | | 11/2006 | Garman et al. |
| 2007/0046143 A1 | | 3/2007 | Blandino et al. |
| 2007/0090782 A1 | | 4/2007 | Endo et al. |
| 2007/0279793 A1 | | 12/2007 | Hansen et al. |
| 2007/0280679 A1 | * | 12/2007 | Kato et al. .................... 396/529 |
| 2008/0017816 A1 | | 1/2008 | Willats et al. |
| 2008/0030891 A1 | | 2/2008 | Kim et al. |
| 2008/0094728 A1 | | 4/2008 | Matsumoto et al. |
| 2008/0304126 A1 | | 12/2008 | Powell et al. |
| 2009/0293654 A1 | | 12/2009 | Pintauro |
| 2010/0053412 A1 | | 3/2010 | Sekimoto et al. |
| 2010/0220988 A1 | | 9/2010 | Ohno |
| 2011/0174979 A1 | | 7/2011 | Garman et al. |
| 2011/0206362 A1 | * | 8/2011 | Viglione et al. .............. 396/453 |
| 2011/0211823 A1 | | 9/2011 | Tsai |
| 2011/0234892 A1 | | 9/2011 | Yasuda et al. |
| 2012/0019404 A1 | * | 1/2012 | Brosio ......................... 341/112 |
| 2012/0063014 A1 | | 3/2012 | Terahara et al. |
| 2012/0257099 A1 | | 10/2012 | Tsai |
| 2012/0260002 A1 | * | 10/2012 | Hildebran ............ G05B 19/056 710/9 |
| 2014/0061467 A1 | * | 3/2014 | Buzerak et al. ........... 250/338.1 |

FOREIGN PATENT DOCUMENTS

| | | |
|---|---|---|
| JP | 2001172766 | 6/2001 |
| JP | 2007114672 A | 5/2007 |
| WO | WO 95/33226 | 12/1995 |

OTHER PUBLICATIONS

United States Notice of Allowance dated Aug. 4, 2014 in connection with U.S. Appl. No. 14/170,237; 13 pages.

U.S. Office Action dated Dec. 4, 2014 in connection with U.S. Appl. No. 14/170,348; 19 pages.

U.S. Office Action dated Nov. 6, 2014 in connection with U.S. Appl. No. 13/669,996; 8 pages.

International Search Report and Written Opinion dated Oct. 27, 2014 in connection with International Patent Application No. PCT/US2014/042009, 8 pages.

International Search Report and Written Opinion dated Nov. 12, 2014 in connection with International Patent Application No. PCT/US2014/041769, 13 pages.

International Search Report and Written Opinion dated Oct. 29, 2014 in connection with International Patent Application No. PCT/US2014/041966, 8 pages.

International Search Report and Written Opinion dated Oct. 29, 2014 in connection with International Patent Application No. PCT/US2014/041963, 8 pages.

U.S. Office Action dated Mar. 13, 2015 in connection with U.S. Appl. No. 14/088,176; 13 pages.

U.S. Office Action dated May 7, 2015 in connection with U.S. Appl. No. 14/091,128; 18 pages.

U.S. Office Action dated Apr. 20, 2015 in connection with U.S. Appl. No. 13/669,996; 13 pages.

U.S. Office Action dated May 20, 2015 in connection with U.S. Appl. No. 14/071,970; 25 pages.

Yukio Miyakawa, "Friction and Wear Performance of Gold and Gold Alloy Films"; National Aerospace Laboratory, Tokyo Japan; 1980; pp. 21-30.

Charles S. Clark; "Resolution for Fretting Wear Contamination on Cryogenic Mechanism"; 41st Aerospace Mechanisms Symposium, Jet Propulsion Laboratory; May 16-18, 2012; pp. 399-410.

Donald H. Buckley; "Friction, Wear, and Lubrication in Vacuum"; National Aeronautics and Space Administration; 1971; 191 pages.

Donald F. King, et al., "3rd-generation MW/LWIR sensor engine for advanced tactical systems", Infrared Technology and Applications XXXIV, Proc. of SPIE, vol. 6940, 2008, 12 pages.

"Diaphragm (optics)", Wikipedia, Oct. 7, 2012, 4 pages.

"Aperture", Wikipedia, Nov. 4, 2012, 9 pages.

Kazuhisa Miyoshi, et al., "Durability Evaluation of Selected Solid Lubricating Films", May 2001, 12 pages.

M. A. Sherbiney et al., "Friction and Wear of Ion-Plated Soft Metallic Films", Wear, 45 (1977), p. 211-220.

S. Jahanmir, et al., "Sliding Wear Resistance of Metallic Coated Surfaces", Wear, 40 (1976), p. 75-84.

International Search Report and Written Opinion dated Feb. 6, 2014 in connection with International Patent Application No. PCT/US2013/068649.

International Search Report and Written Opinion dated Feb. 5, 2014 in connection with International Patent Application No. PCT/US2013/068678.

International Search Report dated Oct. 27, 2014 in connection with International Patent Application No. PCT/US2014/042010.

U.S. Office Action dated Jun. 10, 2014 in connection with U.S. Appl. No. 13/669,996; 18 pages.

U.S. Office Action dated Mar. 31, 2014 in connection with U.S. Appl. No. 14/170,348; 10 pages.

U.S. Office Action dated Aug. 20, 2015 in connection with U.S. Appl. No. 13/669,996; 12 pages.

U.S. Office Action dated Aug. 24, 2015 in connection with U.S. Appl. No. 14/091,128; 23 pages.

U.S. Office Action dated Nov. 13, 2015 in connection with U.S. Appl. No. 14/071,970; 19 pages.

U.S. Office Action issued for U.S. Appl. No. 14/091,128 dated Jan. 21, 2016, 18 pgs.

* cited by examiner

NOMINAL RESPONSE

WITH 25% SENSED INCREASE IN RESISTANCE

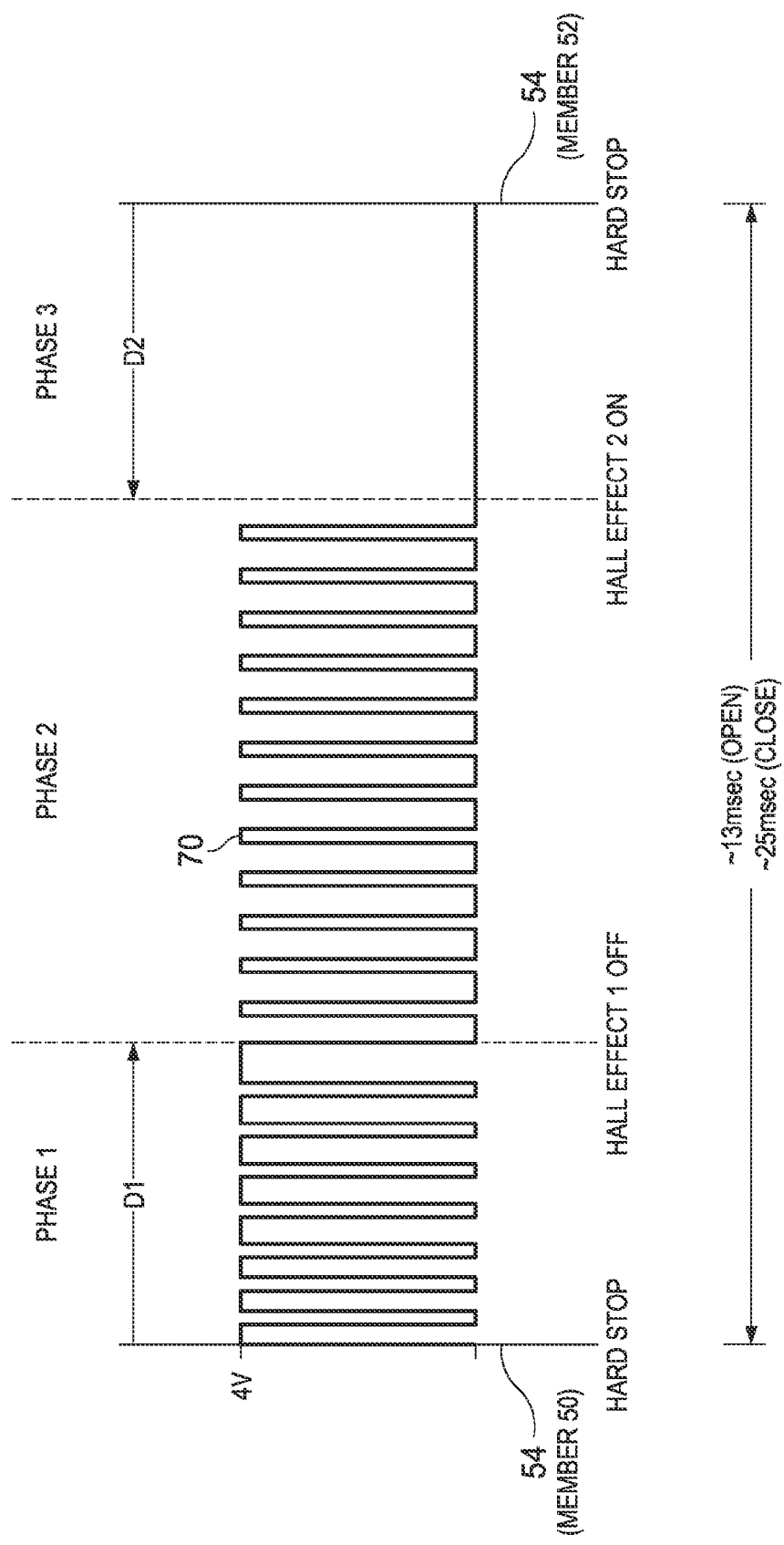

PULSE WIDTH MODULATION CONTROL OF SOLENOID MOTOR

CROSS-REFERENCE TO RELATED APPLICATIONS AND CLAIM OF PRIORITY

The present application is a continuation-in-part of U.S. patent application Ser. No. 14/091,128 entitled "METHOD FOR EMBEDDED FEEDBACK CONTROL FOR BI-STABLE ACTUATORS" filed Nov. 26, 2013, and is also a continuation-in-part of U.S. patent application Ser. No. 14/088,176 entitled "VACUUM STABLE MECHANISM DRIVE ARM" filed Nov. 22, 2013. This application also claims priority to U.S. Provisional Patent Application Ser. No. 61/833,592, filed Jun. 11, 2013, entitled "PULSE WIDTH MODULATION CONTROL OF SOLENOID MOTOR", U.S. Provisional Patent Application Ser. No. 61/833,599, filed Jun. 11, 2013, entitled "THERMAL CONTROL IN VARIABLE APERTURE MECHANISM FOR CRYOGENIC ENVIRONMENT", and U.S. Provisional Patent Application Ser. No. 61/833,587, filed Jun. 11, 2013, entitled "VARIABLE APERTURE MECHANISM FOR CRYTOGENIC ENVIRONMENT, AND METHOD". The content of the above-identified patent documents is incorporated herein by reference.

FIELD OF THE DISCLOSURE

The present disclosure is directed in general to drive mechanisms and actuators, and more specifically to motors, drive arms and actuators utilized in thermally sensitive devices including but not limited to bi-stable motors configured to establish a drive member in two or more positions.

BACKGROUND OF THE DISCLOSURE

Drive mechanisms including actuators are conventionally utilized to control the selective positioning of one or more members of a system. System design requirements dictate, and often limit, the specific design suitable for the application. In some environments, the system member to be controlled and/or manipulated is extremely thermally sensitive, such as infrared (IR) thermal imaging systems having movable shutters, including those operating in a true IR Dewar environment operating at cryogenic temperatures. Some conventional drive mechanisms are not suitable in such thermally sensitive systems where a thermal barrier needs to be maintained between a driving actuator and the driven device, such as to minimize or avoid stress, binding, wear and inconsistent operation of the system. Other conventional drive mechanisms have unreliable and inconsistent drive paths, and difficulty of meeting or staying within design tolerances.

SUMMARY OF THE DISCLOSURE

To address one or more of the above-deficiencies of the prior art, one embodiment described in this disclosure comprises a drive mechanism for controllably driving a thermally isolated actuator between two positions. The drive mechanism includes a rotary actuated motor configured to rotatably drive a motor member, and a drive member coupled to the motor member and having a drive arm configured to responsively move from a first position to a second position upon rotation of the motor member. An actuator is responsive to movement of the drive arm moved from the first position to the second position. A drive circuit is configured to generate a pulse width modulated (PWM) drive signal configured to controllably drive the motor, the PWM drive signal having a first duty cycle configured to advance the drive arm from the first position, and having a second duty cycle different than the first duty cycle as the drive arm approaches the second position. The drive mechanism may comprise at least one sensor configured to determine a position of the drive member when the drive arm is proximate the first position and proximate the second position, wherein the drive circuit is configured to establish the first duty cycle and the second duty cycle as a function of the sensor. The drive circuit may be configured to increase the first duty cycle to accelerate a speed of the drive arm advancing from the first position towards the second position, and is configured to establish the PWM drive signal at the second duty cycle when the drive arm is between the first position and the second position. The drive circuit is configured to eliminate the drive signal when the drive arm is proximate the second position. A hard stop may be configured to provide a hard stop to the drive member after the drive arm reaches the second position. The actuator is thermally isolated from the drive arm in both the first position and the second position.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 23 illustrates a waveform diagram of a motor PWM drive signal configured to vary a speed of the solenoid motor during the transition of the drive arm from the first position to the second position.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
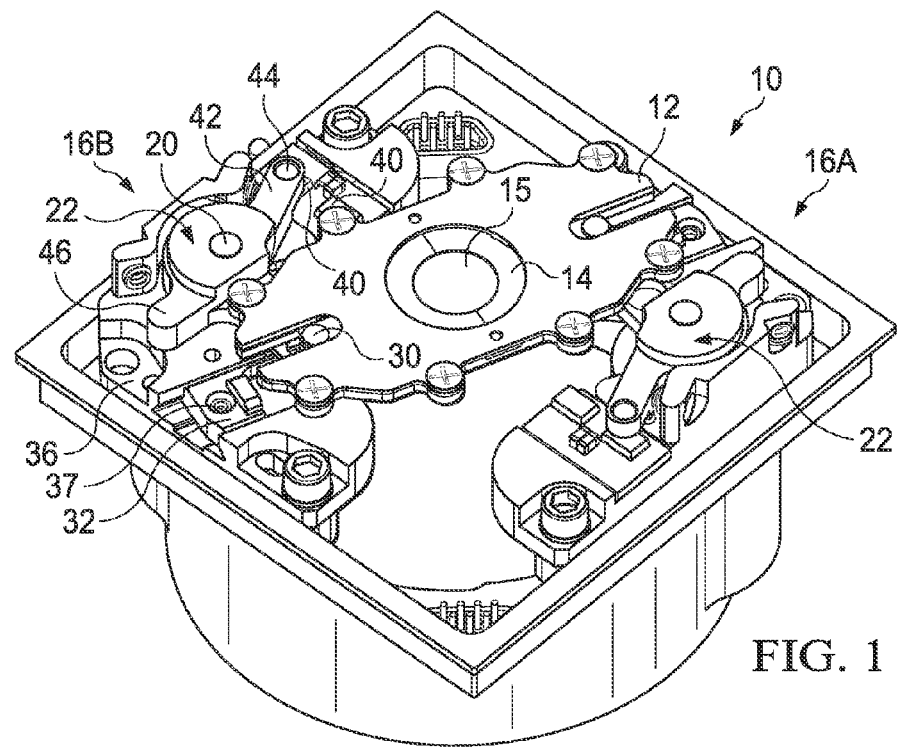
FIG. 1 illustrates a thermal imaging device including a shutter and a thermally isolated drive system configured to position the shutter according to an embodiment of the present disclosure.

FIG. 1 illustrates a top perspective view of an IR thermal imaging shutter apparatus 10 including a variable aperture mechanism (VAM) operable at ultra-high vacuum and at a cryogenic temperature. Apparatus 10 includes a shutter assembly generally shown at 12 comprising a pair of sliding aperture blades 14. The sliding aperture blades 14 together define a shutter aperture 15, and each blade 14 is configured to be driven by a respective drive mechanism generally shown at 16A and 16B to selectively establish a shape of the aperture 15. The aperture blades 14 are each enclosed in a cavity defined between a pair of thermally conductive members defining a sleeve, each aperture blade 14 having two positions, a closed position to define the aperture 15 having a smaller shape as shown in FIG. 1, and a retracted position to define a larger shape aperture 15 (not shown) such that the aperture 15 is configured to work with an imaging device (not shown) having two different fields of view as will be described in more detail shortly with respect to FIG. 4. The shutter assembly 12 is advantageously configured to operate at a cryogenic temperature in a high-vacuum environment, whereby the blades 14 maintain a thermally stable temperature both at rest and during a transition between positions, and which blades 14 are thermally isolated from the non-cooled apparatus 10 elements, such as the drive mechanism 16A and 16B, and the ambient which is critical such that the imaging device can be immediately used after aperture shape and diameter changes without a significant wait time, as will be detained shortly in respect to FIG. 4.

Figure 2:
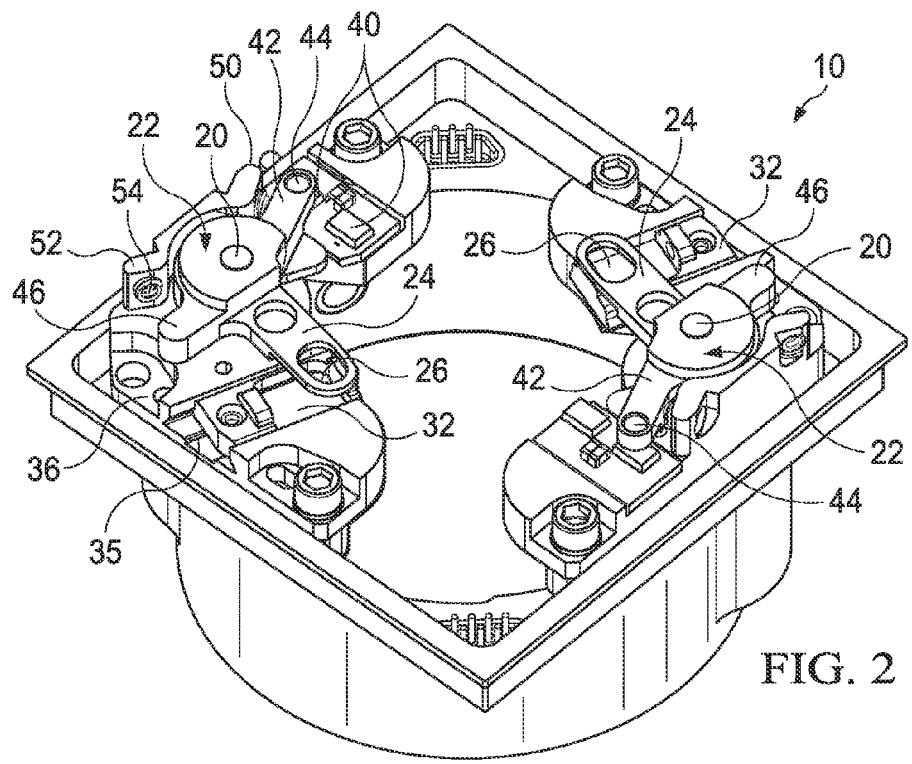
FIG. 2 illustrates the thermally isolated drive system of FIG. 1 with the shutter removed.
Figure 5:
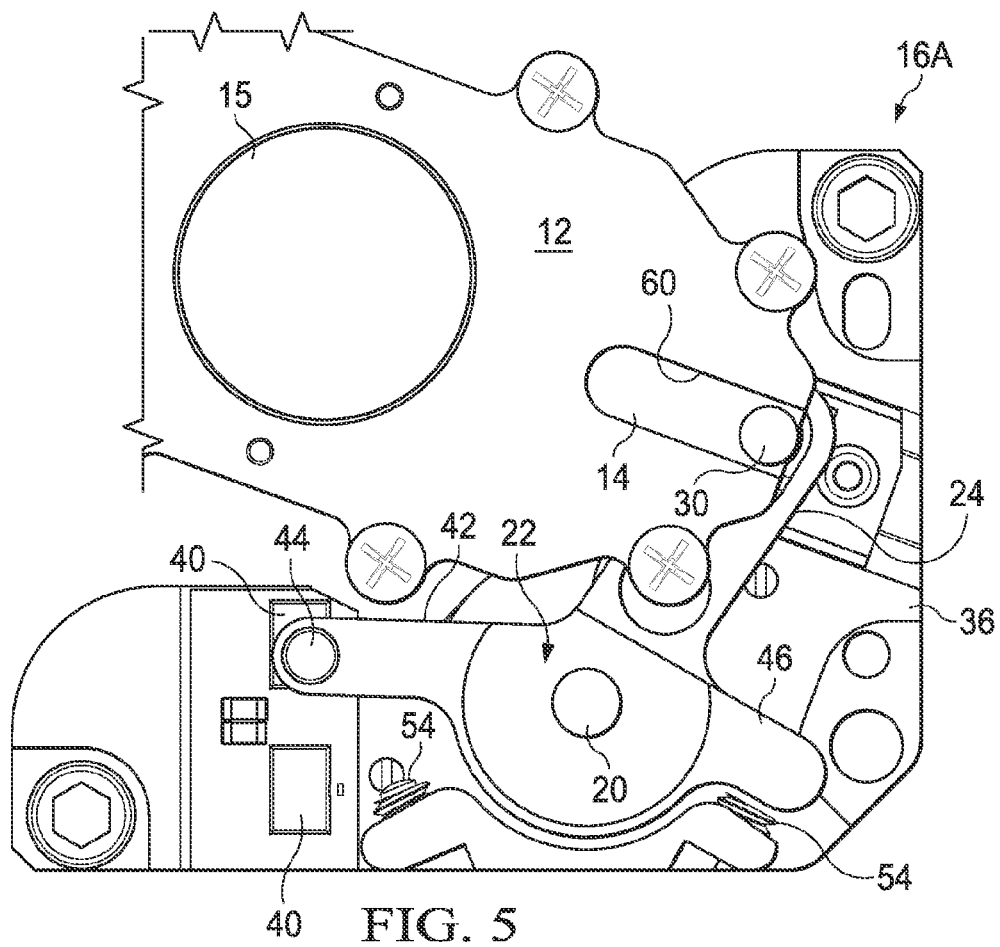
FIG. 5 illustrates the drive arm in a first "full open" position wherein the shutter slider member is in a corresponding first position.
Figure 6:
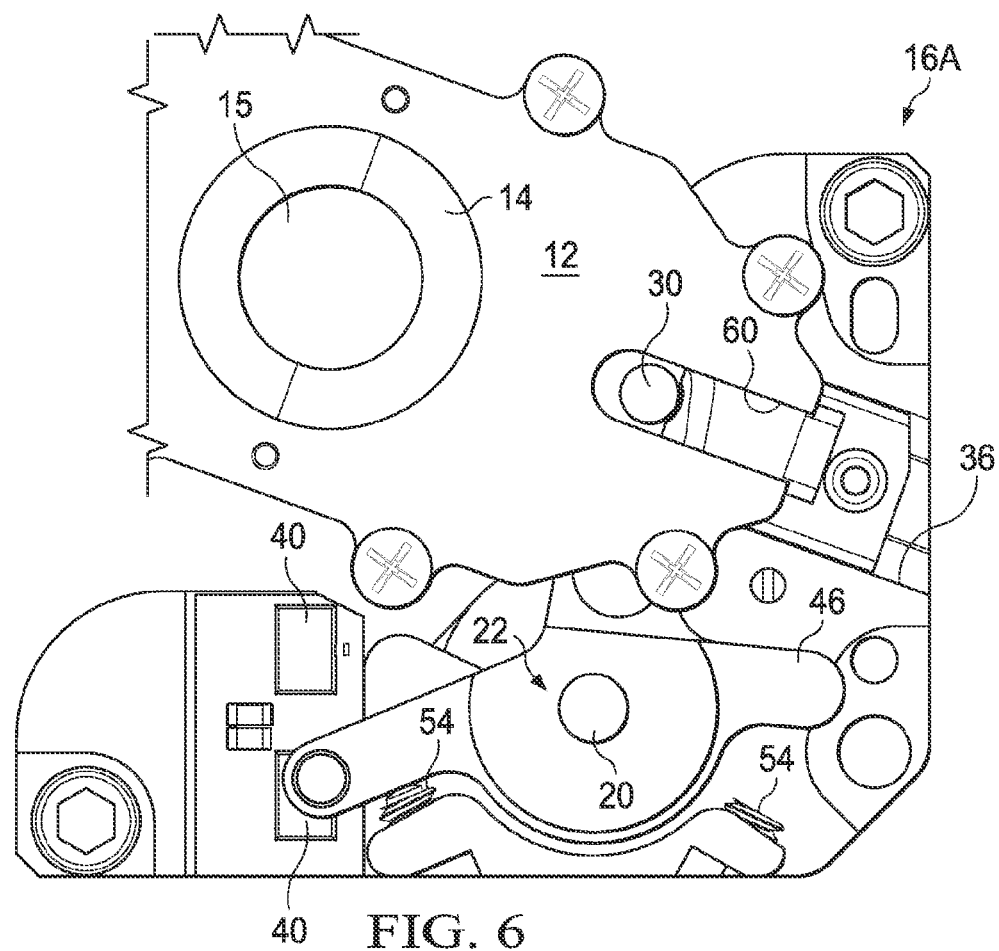
FIG. 6 illustrates the drive arm in a second "full closed" position wherein the shutter slider member is in a corresponding second position.

Each drive mechanism 16A and 16B comprises a rotary motor 18 (see FIG. 3) having a rotatable actuator pin 20 coupled to and driving a balanced rotatable drive crank 22. Each drive crank 22 has a radially extending elongated arm 24 (see FIG. 2), configured to selectively rotate arm 24 between a first "full open" position and a second "full closed" position as shown in FIG. 5 and FIG. 6, as will be discussed shortly. Each arm 24 has a distal end having a recess 26, as shown in FIG. 2, the recess 26 preferably comprising an elongated opening in one preferred embodiment as shown. The recess 26 could also comprise a slot or other open ended structure if desired, and limitation to an opening is not to be inferred.

Each arm recess 26 is configured to receive, but is spaced from, a respective positioning member 30 and roller 34 (see FIG. 4) rotatably disposed thereabout. Each member 30 preferably comprises a shutter pin secured to, and thermally coupled with, one respective end of the aperture blade 14 formed as a triangle and opposite the blade end defining the aperture 15 as shown in FIG. 4. This triangular shape of the aperture blade proximate the respective member 30, and the separation of each member 30 from the opposing blade end, helps isolate any heat created on member 30 during aperture positioning from the blade aperture ends proximate the imaging device to reduce imaging degradation due to such heat. Each member 30 extends downwards and is connected to a magnet 31 that remains physically and thermally separated above a respective magnetic detent latch 32. Each detent latch 32 is securingly and slidably received in a respective slot 35 (see FIG. 3) defined in a frame 36. Each detent latch 32 is preferably comprised of a plug configured to slide linearly inside the corresponding slot 35 in frame 36, and locked into position when positioned in the final desired location by a set screw 37 pressing the plug upwards into slot 35, providing an accessible locking feature while inducing minimal additional linear motion. Upon rotation of the arms 24, the respective openings 26 engage the respective roller 34 encompassing the respective shutter pin 30 to linearly move the aperture blade 14 between a first full open position and a second full closed position, wherein the roller 34 rotates in the opening 26 during transition, and is then spaced therefrom at the end of the transition.

FIG. 2 depicts the apparatus 10 with the shutter apparatus 12 removed, illustrating the drive mechanisms 16A and 16B including the respective arms 24 having openings 26, the magnetic detent latches 32 without shutter pins 30, as well as two pairs of proximity sensors 40 (see FIG. 3) to indicate the final position of each respective arm 24, preferably comprised of Hall effect sensors. Each drive crank 22 has a proximity indicating arm 42 including a magnet 44 disposed at a distal end therein and selectively extending over one of the proximity sensors 40 as a function of the arm 24 position. When the arm 24 is in the first full open position as shown in FIG. 5, the first proximity sensor 40 indicates the drive crank 22 is in place at the open position, and when the arm 24 is in the second full closed position as shown in FIG. 6, the second proximity sensor 40 indicates the drive crank 22 is in place at the closed position. Magnetic cogging, created internally to the actuator 18 and in the detent magnetic latch 32, forces the arms 42 and 46 against the set screws 54 in stops 50 and 52 and prevents any play at the end of travel.

Figure 3:
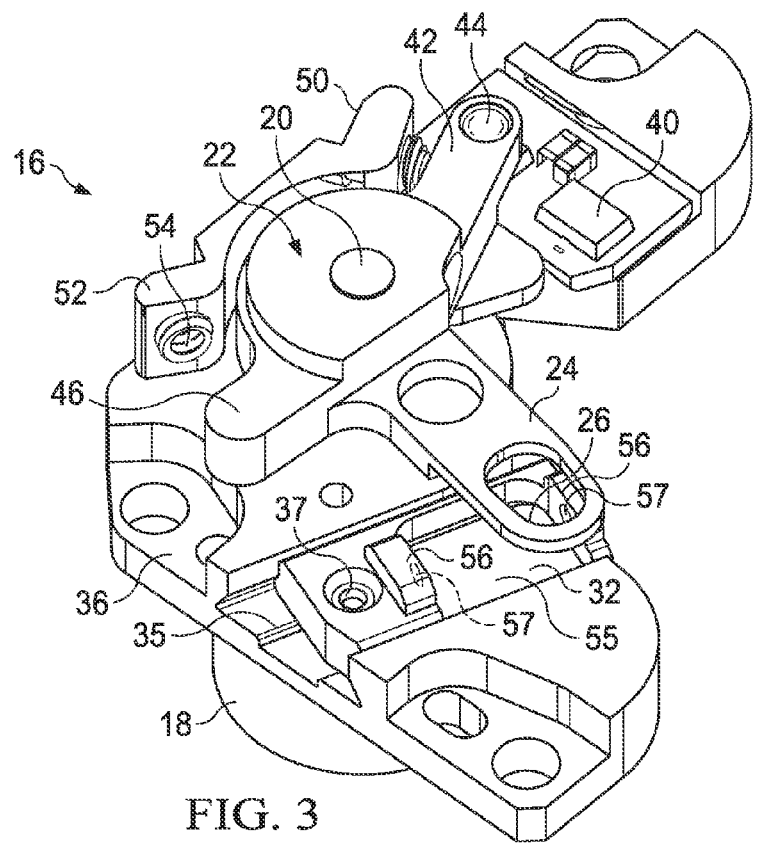
FIG. 3 illustrates a perspective view of one drive mechanism.
Figure 4:
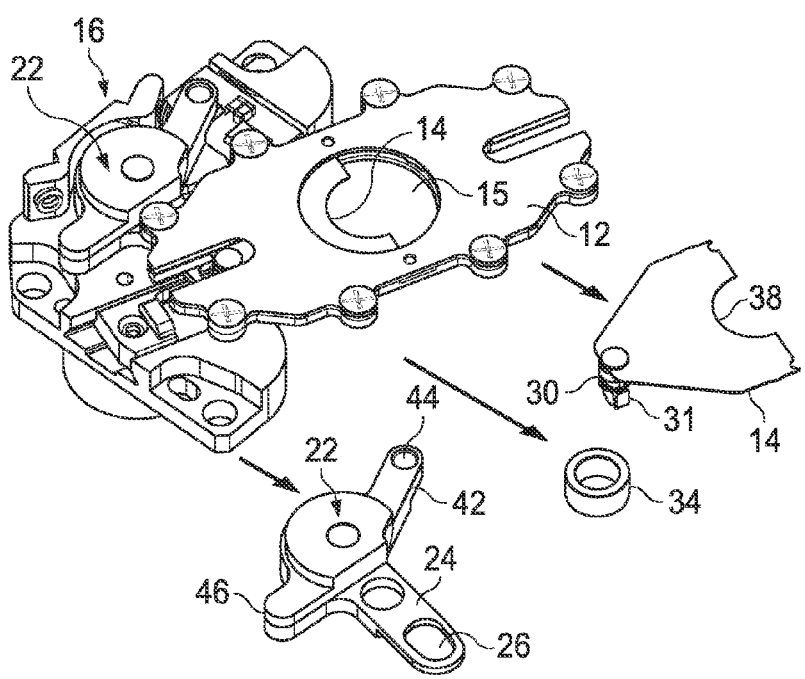
FIG. 4 illustrates an exploded view of part of the drive system illustrating the drive arm having an elongated recess configured as an opening to receive a drive pin and roller of the shutter slider member.

FIG. 3 depicts a perspective view of one drive mechanism 16 with arm 24 positioned in the second position, illustrating the travel path of the arm, which may be, for instance, 24 degrees, although limitation to this path is not to be inferred. The detent magnetic latch 32 is comprised of a non-magnetic metal, such as stainless steel, and is seen to have a recess 55 and a pair of end stops 56, with one end stop 56 defined on each end of the recess 55. A magnet 57 is attached to, or embedded in, the opposing faces of end stops 56. The magnets 57 are each configured to magnetically pull the respective magnet 31, and thus pin 30 and associated roller 34 (FIG. 4), when the magnet 31 is advanced by arm 24 proximate thereto. When arm 24 advances from the first position (FIG. 5) to the second position (FIG. 6), stop 50 prevents further movement of the arm 24 but the momentum of the pin 30, magnet 31, roller 34 and the associated shutter blade 14 are allowed to continue moving until the blade 14 fully closes and engages a pair of stop members 86 of shutter assembly 12, as shown in FIG. 14A and will be described in more detail shortly. The magnet 31, however, will not make physical contact with the respective magnet 57 and will remain closely proximate and magnetically attracted to magnet 31 to provide a magnetic latch. Basically, the arm 24 undershoots, and the pin 30, magnet 31 and roller 34 advance to separate from the opening 26 and remain thermally isolated from the arm 24, and the stop members 86 limit the travel of pin 30 from overshooting and engaging the other edge of opening 26. Likewise, when the arm 24 advances from the second position to the first position, stop 52 prevents further movement of the arm 24 but the momentum of pin 30, magnet 31, roller 34 and the associated blade 14 are allowed to continue moving until the blade 14 fully opens and engages a pair of sidewalls 78, as shown in FIG. 14A. The magnet 31, however, will not make physical contact with the respective magnet 57 and will remain closely proximate and magnetically attracted to magnet 31 to provide a magnetic latch.

FIG. 4 depicts an exploded view of one drive mechanism 16 and one end of one shutter blade 14 configured to be positioned as a function of the drive mechanism positions. Each shutter blade 14 is very thin and lightweight to help reduce friction. The shutter pin 30 consists of a cylindrical post which captures roller 34 comprising a bushing to prevent sliding along the distal slot 26, wherein roller 34 rolls against the edges of slot 26 to prevent friction and wear. The magnet 31 is provided below shutter pin 30 and provides a magnetic detent pulling when in close proximity to, but not contacting and thermally isolated from, the arms of the detent magnetic latch 32. Each shutter blade 14 has a semicircular notch 38 configured to define the smaller diameter of aperture 15 in the closed position. Each notch 38 may be configured to define a round aperture as shown, but may also have different shapes to define different aperture shapes, such as hexagon, rectangular, elliptical and other shapes.

Figure 9:
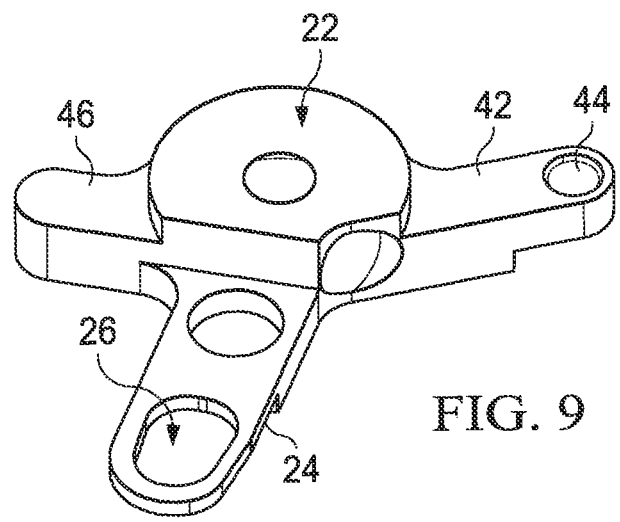
FIG. 9 illustrates a perspective view of the drive crank including the arms.

Each drive crank 22 further comprises a radially extending arm 46, wherein each of arms 42 and 46 are shorter than the elongated arm 24 as shown in FIGS. 5 and 6, as well as FIG. 9. Each of arms 24, 42, and 46 are balanced about the center of the drive crank 22, such that the center of gravity of drive crank 22 is balanced when coupled to the respective actuator pin 20. This makes system 10 far less sensitive to extremely high shock requirements. Each arm 42 and 46 has a travel stop limit comprising a stop member 50 and 52, respectively, of which each contains an adjustable travel limit set screw 54. Stop member limit screws 54 in turn establish the precise travel path and limit of arm 24, and thus the precise limit position of the driven shutter plate 14. Again, proximity sensors 40 indicate whether the drive crank 22, and thus the arm 24 and shutter plate 14, is in one of two positions.

When the shutter plate 14 is in the full open position, the arm 24 of drive mechanism 16A is in the full open position and the shutter pin 30 of drive mechanism 16A is positioned at a distal end of a slot 60 defined in one end of plate 12 as shown in FIG. 5. Correspondingly, the arm 24 of drive mechanism 16B is in the full open position, and the shutter pin 30 of the drive mechanism 16B is outwardly advanced in an opposing slot 60 defined at the opposing end of plate 12. The converse is true when the shutter plate 14 is in the closed position, as can be seen in FIG. 1 and FIG. 6.

Figure 7:
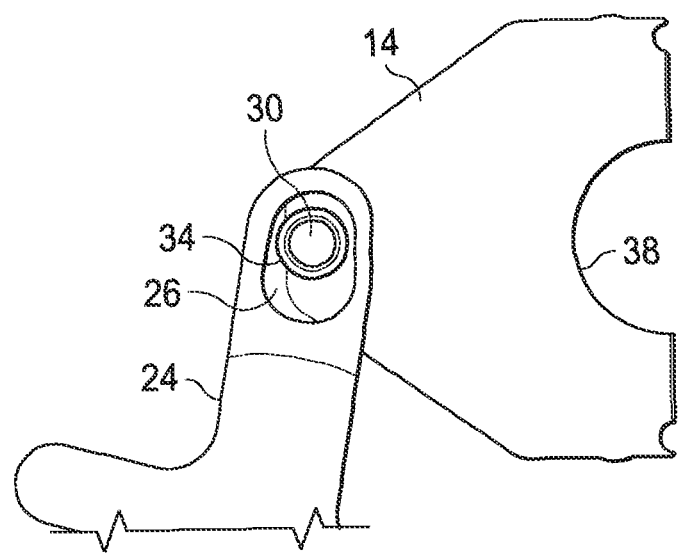
FIG. 7 illustrates a top view of the arm and elongated opening receiving, but physically and thermally separated from, the slider pin and roller in the first and second position.
Figure 8:
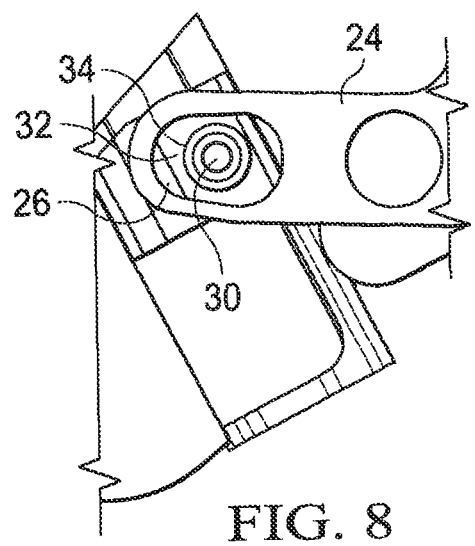
FIG. 8 illustrates a top view of the arm in the first position showing the asymmetric clearance of the arm from the slider pin and roller, including the radial play of the actuator compared to this clearance.

Advantageously, as illustrated in FIG. 7 and FIG. 8, each shutter pin 30 and the corresponding roller 34 remain physically and thermally separated from the respective arm 24 when in the first position and the second position due to a spacing created therebetween in both positions, thus creating a thermal barrier, also referred to as thermal isolation. The arm 24 only engages the rollers 34 disposed about the shutter pin 30 for a very short time period during movement/actuation of the shutter plate 14 from one position to the other. Thus, the drive mechanisms 16A and 16B and all parts thereof are thermally isolated from the driven shutter plate 14 when in the operable full open or full closed position. The shutter mechanism including the plate 12 and shutter plate 14 are preferably configured in a vacuum having a true IR Dewar cryogenic environment.

Moreover, the spacing of the arms 24 from rollers 34 provides the motors 18, and thus the respective arms 24, time to accelerate from the respective first rest position or second rest position which advantageously builds momentum in the arms 24 before engaging and driving the respective rollers 34, converting the actuation mechanism from torque transfer to momentum transfer of energy. This additional momentum helps overcome the magnetic detent forces of the magnetic detent latch 32 acting against the shutter pin 30, holding arms 42 or 46 against the stop posts 50 or 52. The impact of the arm 24 engaging the roller 34 during rotation also helps overcome any stiction that may be present. This spacing increases the required force margin from 25% to 900%. The spacing also allows the use of a less precise solenoid motor 18, which has a relatively large amount of play and thus is less suitable for driving the arm 24 directly. Each arm opening 26 provides a loose fitting about the respective shutter pin 30 and roller 34, such that the motor loose play does not impair operation of the shutter aperture. Conversely, the loose tolerances of the arm openings 26 mitigate the risk of an inadvertent rebound. The aperture blades 14 have internal stops, which engage prior to the holding arms 42 or 46 contacting their respective stop. Since the shutter pin 30 is not firmly engaged within the distal slot 26, the aperture blade can rebound before the arm 42 or 46 contacts the stop set screw 54 and rebounds. Additional margin is provided by the fact that the arm has much higher inertia than the aperture blade, and rebounds correspondingly slower. The high level of damping in the actuator bearings in 18 diminishes the magnitude of the arm rebound. These features prevent a situation where the rebounding arm 24 impacts the shutter pin 30 and roller 34 while traveling in the opposite direction. Such impact could exert extremely high forces onto the shutter pin 30 due to the arm's much higher inertia.

As shown in FIG. 8, the clearance between the respective roller 34 and arm opening 26 is slightly asymmetric, although it may be symmetric if desired. In one preferred implementation, there is about 1.4 degrees of clearance, also referred to as a dead zone, equating to about a 0.011 inch clearance, although limitation to this angular spacing or clearance is not to be inferred. The arm travel limit set stops established by screws 54 are preferably set to detent to within ⅕ of the dead zone, about 0.28 degrees.

In one preferred embodiment, a rotary solenoid is used as motor 18 as it provides consistent reliability and an adjustable stroke, such as manufactured by Brandstrom Instruments of Ridgefield Conn. The fine adjustment features of the drive crank 22 using the travel limit screws 54 in the stationary motor mount stop limit members 50 and 52 help establish this stroke. This design is superior to a piezo drive motor that is inherently unreliable, although is functionally acceptable. Alternate rotary motors could comprise DC stepper motors, and limitation to the particular rotary motor is not to be inferred. This invention has advantages over motors and linkages that may allow motor over-travel which may overstress driven parts.

FIG. 9 illustrates a perspective view of the drive crank 22, including the four balanced arms.

Figure 10:
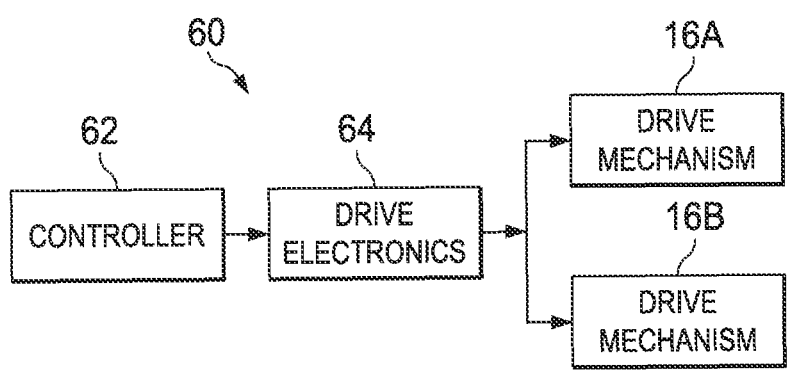
FIG. 10 illustrates a controller circuit configured to control the drive assembly.

FIG. 10 illustrates a control circuit at 60 that is configured to selectively drive each of motors 18, to control the positioning of the arms 24 and thus drive the shutter plate 14 between the first and second positions. The control circuit includes a controller 62 having a processor configured to control drive electronics 64 that interface with motors 18 of drive mechanisms 16A and 16B.

Figure 11:
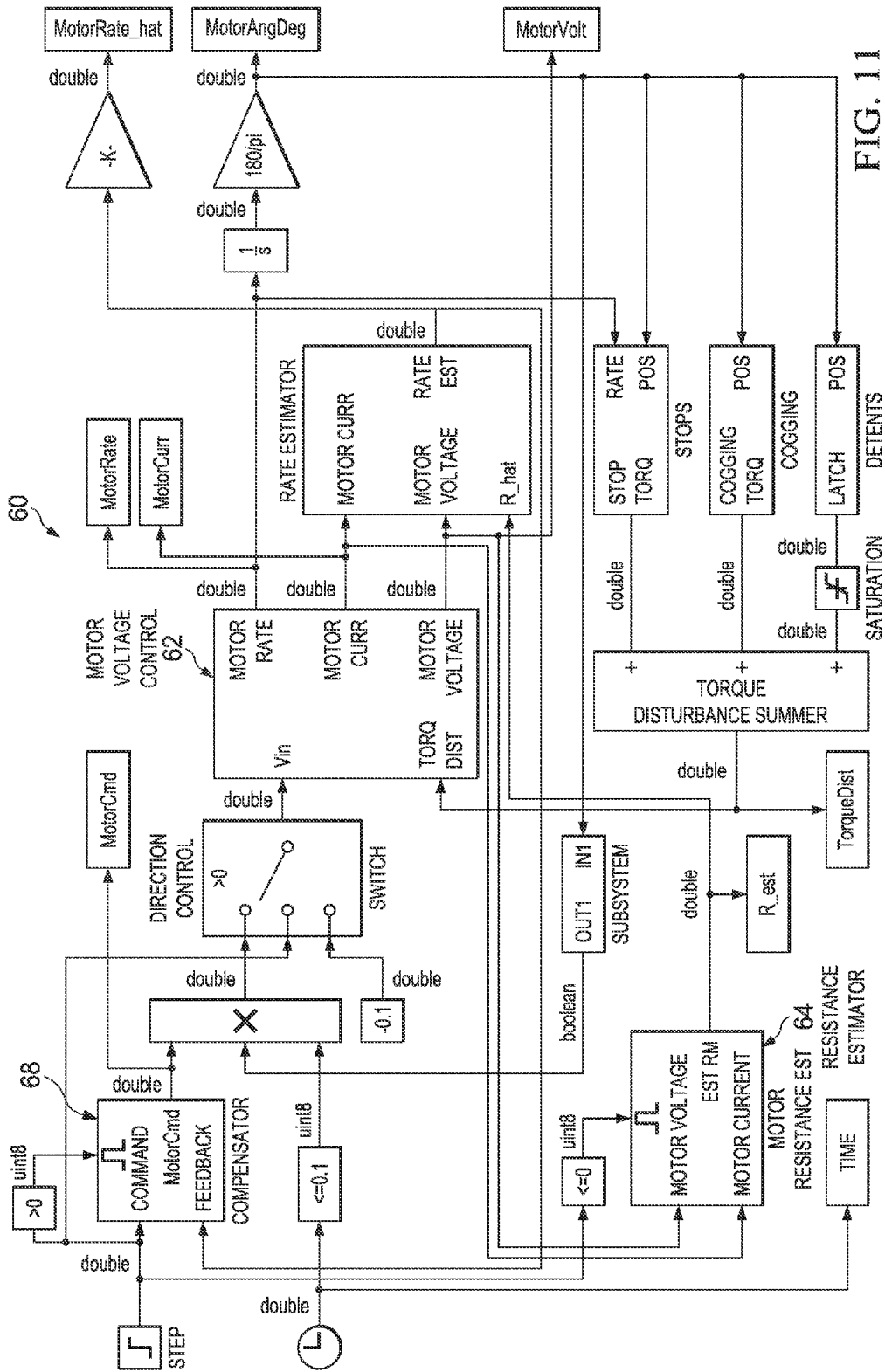
FIG. 11 illustrates a detailed electrical block diagram of the motor controller circuit having velocity control.

Referring now to FIG. 11, there is shown a detailed system diagram of the simulation 60 configured to simulate and control each bi-stable motor 18 of each drive mechanism 16A and 16B such that each bi-stable motor 18, and thus the respective drive crank 22, has a high starting torque, but a slower, regulated velocity as it moves through its range of travel. In turn, each locking arm responsively has a high drive force at the beginning of travel to release from the respective Hall Effect sensor 40 establishing the first detent position. In addition, each limit arm 46 has a lower kinetic energy at end of travel by limiting the terminal velocity and establishing a softer stop when engaging the respective stop limit 50 and 52. Rebounds are significantly reduced by lowering the kinetic energy at the end of the actuator travel path.

Each motor 18 acts as a tachometer, as motor rotation generates a back-emf proportional to motor rate. In a driven motor, back-emf is masked by the voltage drops across the motor coil impedance. However, the speed of the motor 18 can be computed from a knowledge of the back-emf constant Ke, motor coil resistance Rm, motor input voltage Vd, and motor current Im according to the following equation:

$$Wm=1/Ke(Vd-ImRm)$$

The advantages of the back-emf control loop include no need for a transducer as the resistance of the motor coil is used. Further, there is no reduction in motor starting torque. This approach is more effective than energy dissipators. In one embodiment, the impact velocity of limit arm 46 is reduced from 143 rad/sec to 20 rad/sec, which significantly reduces the impact energy by 98%.

Controller 60 obtains the values of bi-stable motor 18 parameters by measurement immediately before driving the motors to advantageously maintain control of the motors in the unstable system. For instance, the resistance Rm and inductance Lm of the respective motor coils are measured. In one embodiment, each actuator motor 18 may drive arm 46 into limit stop 50 or 52 by a small calibration voltage Vd, such as a short 0.1V pulse of 5 or 10 ms, provided by motor control circuit 62. The coil resistance Rm may be calculated by resistance estimator circuit 64 correlating the sensed current Im associated with the calibration voltage Vd. Estimator 64 may be a field programmable gate array (FPGA). Inductance Lm may be measured similarly by control circuit 60 providing low level AC currents to the motors. Advantageously, the motor back-emf is sensed through the coil resistance, and an estimated motor rate circuit 66 determines the motor rate as a function of this back-emf, and sends a feedback signal indicative of the motor rate to a feedback loop junction 68 to maintain the desired motor rate.

The system, shown modeled in Matlab, provides the basis for operation of the back-emf. Upon initialization the system must first identify on which stop it is, achieved by observing the return from the two Hall Effect proximity sensors. The system must also determine if the commanded move is in the appropriate direction. If the command to move is consistent with the arm position, then the system initiates the resistance measurement sequence. During this sequence, the arm is commanded to move in the opposite direction, directly into the stop, at a low voltage command level. The current is measured using a sense resistor or other means. Given that sense resistors exhibit far better resistance stability than the copper windings within the motor, the resistance of the motor can be deduced by determining the overall resistance of the system, then subtracting out the sense resistor. If desired, a look-up table can be employed to compensate for the sense resistor thermal changes. While theoretically the system could be operated using only a temperature sensor and a look-up table, the temperature in the motor can change during operation and subsequent moves at a nominal temperature could act against significantly different motor resistance.

Once the resistance is measured, it is sent to the rate estimator to set the gain and the command to move in the proper direction is issued. The motor command is sent into a compensator. In this embodiment, the compensator is described by the transfer function:

$$G_{comp}(s) = \frac{V_{cmd}}{\text{Error}} = 1.034 \times 10^6 \frac{(s+689)(s+275)}{(s+1.393 \times 10^5)(s+166)(s+0.1695)}$$

The compensated command is then sent to the plant model, described by the transfer function in this embodiment as:

$$G_{Plant}(s) = \frac{\omega}{V_{cmd}} = 7.219 \times 10^{10} \frac{s}{(s+1.028 \times 10^5)(s+1809)(s+725.7)(s-507.2)}$$

The pole located in the positive domain (s-507.2) is a direct result of the inherent instability of the system. It is also noteworthy that does not attempt to cancel the unstable pole by the addition of a zero in the positive domain (unstable pole cancellation). The closed loop transfer function of the system is described by:

$$G_{cl}(s) = \frac{\text{Error}}{\text{Cmd}} = \frac{1}{1+G_{comp}(s)G_{Plant}(s)}$$

$$G_{cl}(s) = \frac{(s+1809)(s+725.7)(s-507.2)(s+166)(s+0.1659)}{(s+616.6)(s+405.2)(s-0.048)(s^2+1140s+1.561 \times 10^6)}$$

Since unstable pole cancellation was not attempted, one of the closed loop poles (s-0.048) remains unstable. However, the unstable pole is pulled close to the origin and the time constant of the pole is now approximately 21 seconds. Given that the move is completed in less than 100 milliseconds, the response of this pole is sufficiently slow that unstable behavior does not have adequate time to manifest itself before the move is complete. Other actuators and systems may require different compensation. An engineer skilled in the art can be expected to tailor the compensator for a given plant and actuator combination, such that the unstable poles are sufficiently slow so as not to manifest themselves in a deleterious manner. While compensated commands are sent to the motor, the motor rate is estimated by measuring the voltage picked off from a sense resistor. The motor command and the sensed rate is then fed through lead-lag and lag compensation to account for phase shifts generated by the motor inductance. Once a rate estimate is generated, it is fed back to adjust the motor command.

The simulation applied torque disturbances to the actuator arm. These disturbances represented the detent torque acting on the arm from the magnetic latches on the aperture, as well as internal cogging of the motor. These torques acted the most strongly on the arm at the extremes of travel. The disturbances captured the unstable behavior of the actuator. Other torque disturbances, such as friction, viscous damping, and air resistance could be included in other plant embodiment simulations.

In this embodiment, the command to move is terminated when the arm passes the Hall Effect proximity sensor nearest to the end of travel. Iterations of the simulation indicated that the settling time was reduced if the drive current was removed from the actuator prior to hitting the stop. In other embodiments, it may be preferable to apply power to the actuator up to or after initial contact with the stop.

Velocity control of solenoids is not common since they generally require position feedback hardware for stability. Velocity control using estimates of back EMF is not as precise as can be achieved by means of tachometers, resolvers or angle potentiometers. However, in this application precise velocity control is not required. And the effect of the unstable pole builds up too slowly to be a problem. Additional velocity or position measuring devices will not fit in the space available and would add to cost. This method achieves adequate velocity control without additional hardware. Accurate measurement of the motor coil resistance is crucial to maintain control, and should be accurate to within +3%/−1% for reliable and stable control of the motors. Errors in motor coil resistance greater than these levels can cause oscillations between stops, and/or settling at a stop position. Unsensed inductance changes of about 20% can be tolerated, and 10% is preferred. Advantageously, the calculation of these motor values is independent of temperature, which is important because the resistance of motor coils, such as copper windings, can vary greatly over operating temperatures. For instance, the resistance of copper over a MIL-SPEC temperature range can vary by over 25%.

Figure 12:
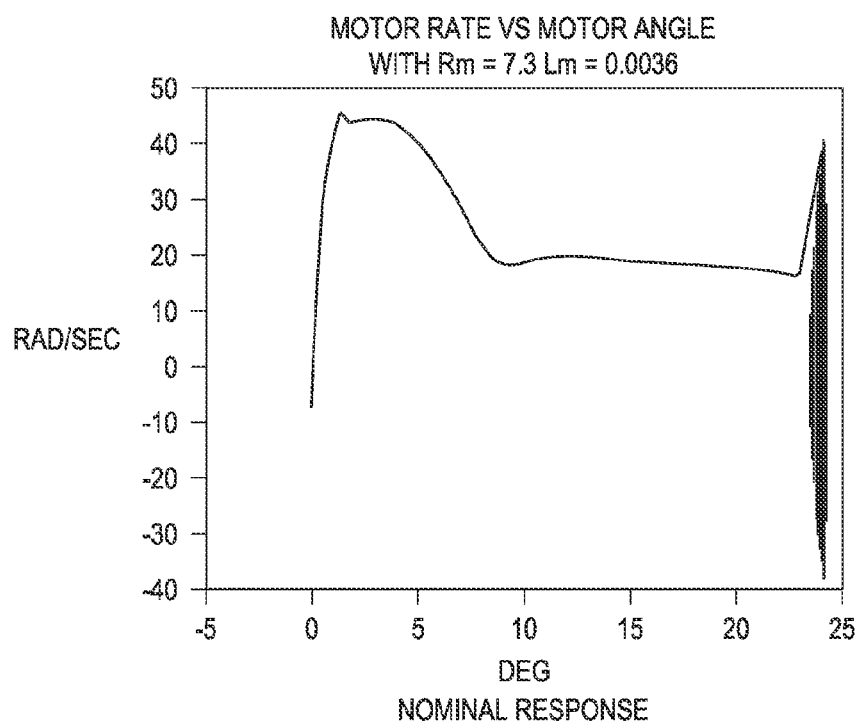
FIG. 12 illustrates a nominal response of the motor rate vs. motor angle.

FIG. 12 illustrates a nominal response of the motor rate vs. motor angle with Rm=7.3 and Lm=0.0036.

Figure 13:
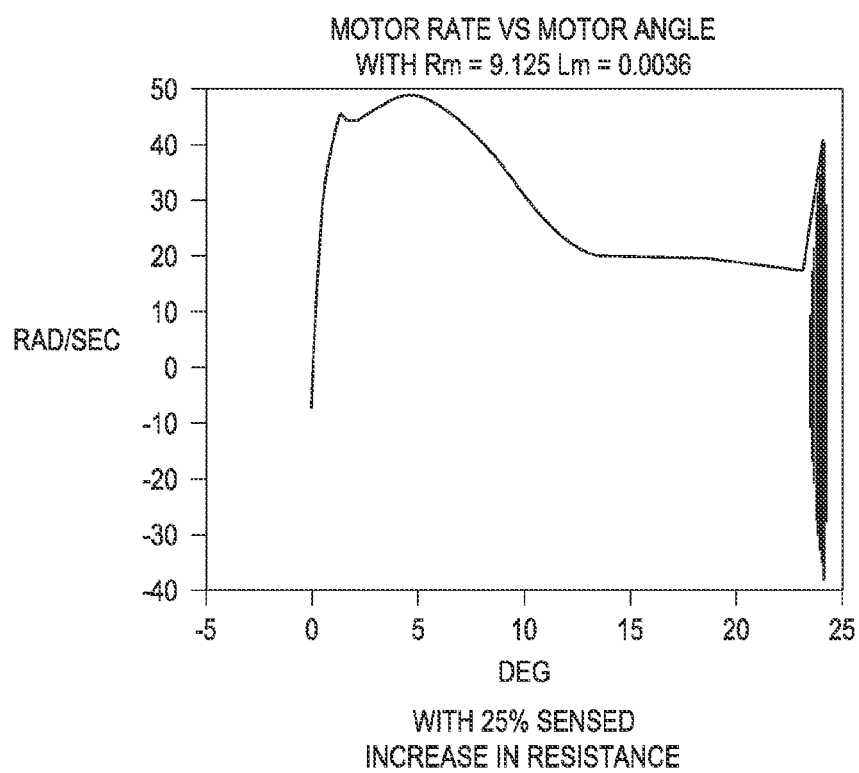
FIG. 13 illustrates a response with a 25% sensed increase in resistance.

FIG. 13 illustrates a response with a 25% sensed increase in resistance, where Rm=9.125 and Lm=0.0036.

Figure 14:
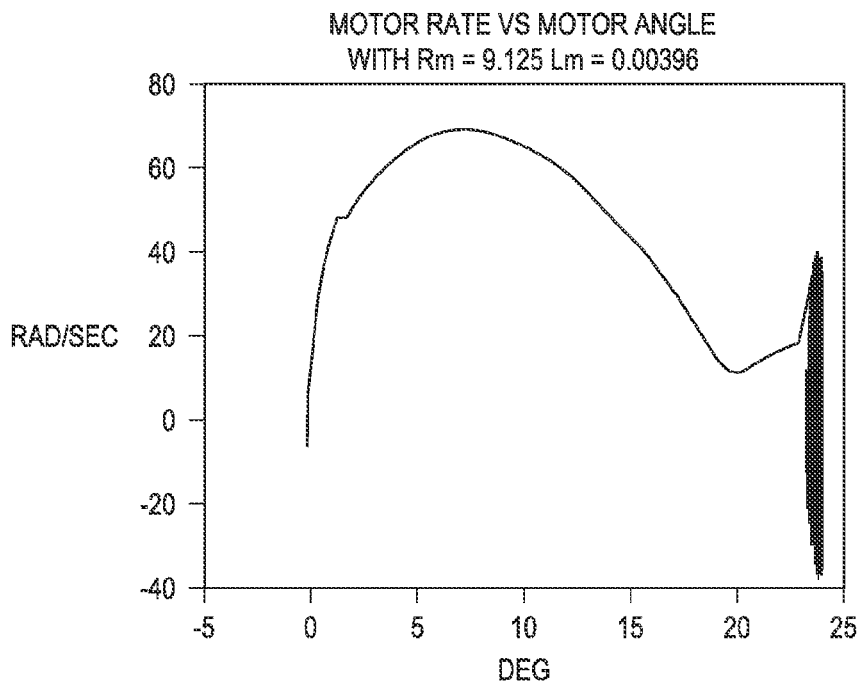
FIG. 14 illustrates a response with at 25% sensed increase in resistance and 10% unsensed increased in inductance.

FIG. 14 illustrates a response with at 25% sensed increase in resistance and 10% unsensed increased in inductance, where Rm=9.125 and Lm=0.00396.

Figure 15:
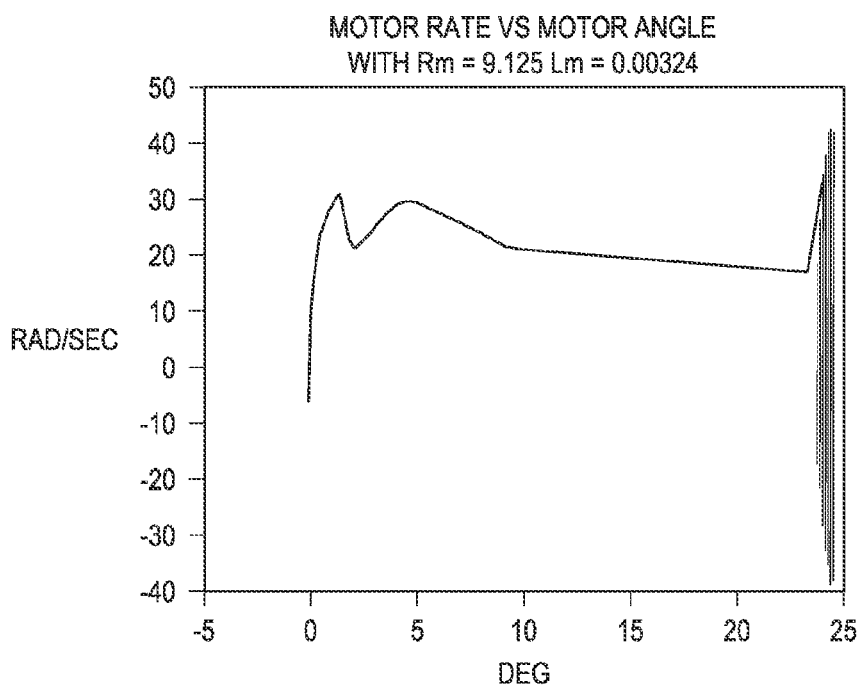
FIG. 15 illustrates a response with at 25% sensed increase in resistance and 10% unsensed decrease in inductance.

FIG. 15 illustrates a response with at 25% sensed increase in resistance and 10% unsensed decrease in inductance, where Rm=9.125 and Lm=0.00324.

Figure 16:
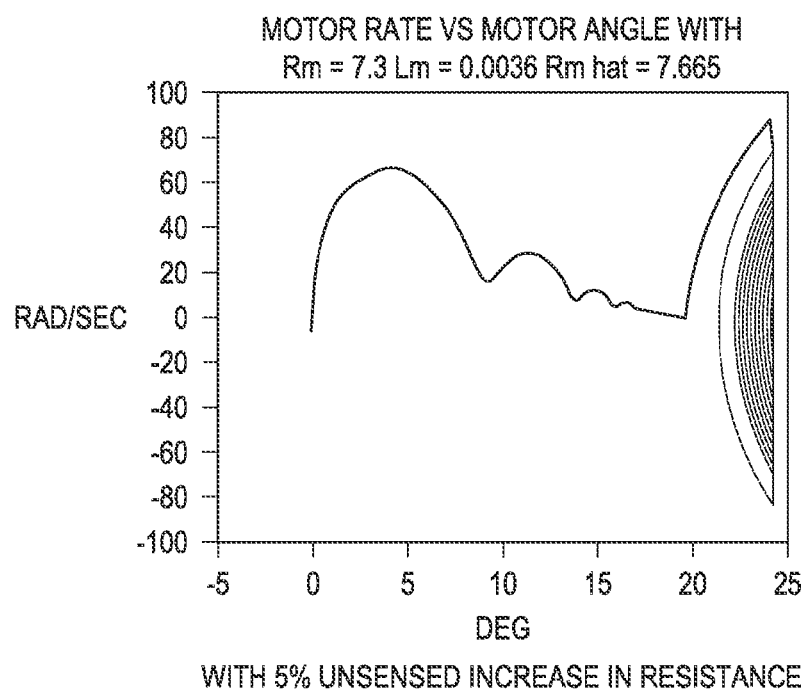
FIG. 16 illustrates a 5% unsensed increase in resistance showing an uncontrolled response.

FIG. 16 illustrates a 5% unsensed increase in resistance where Rm=7.3, Lm=0.0036 and Rm hat=7.665, showing an uncontrolled response.

Figure 17:
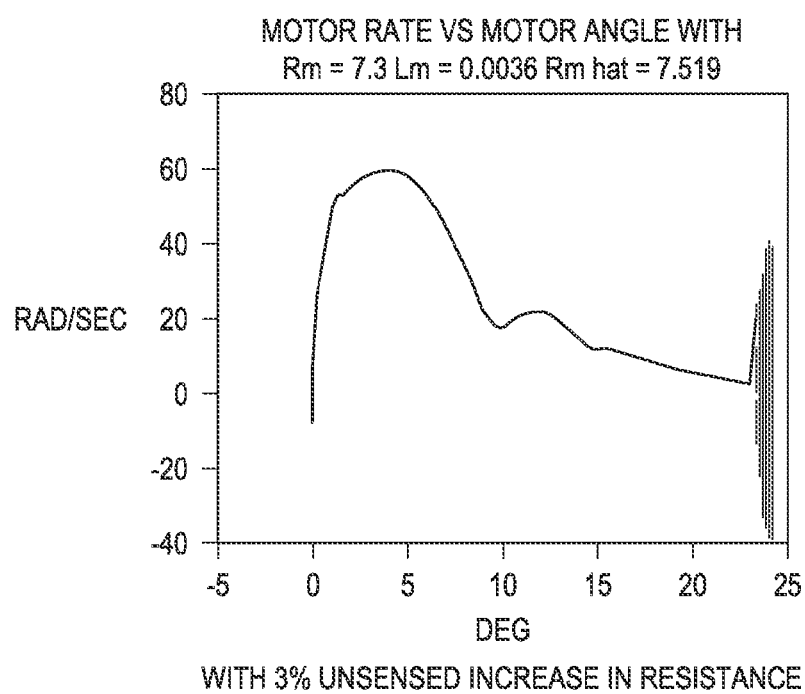
FIG. 17 illustrates a 3% unsensed increase.

FIG. 17 illustrates a 3% unsensed increase in resistance where Rm=7.3, Lm=0.0036 and Rm hat=7.519.

Figure 18:
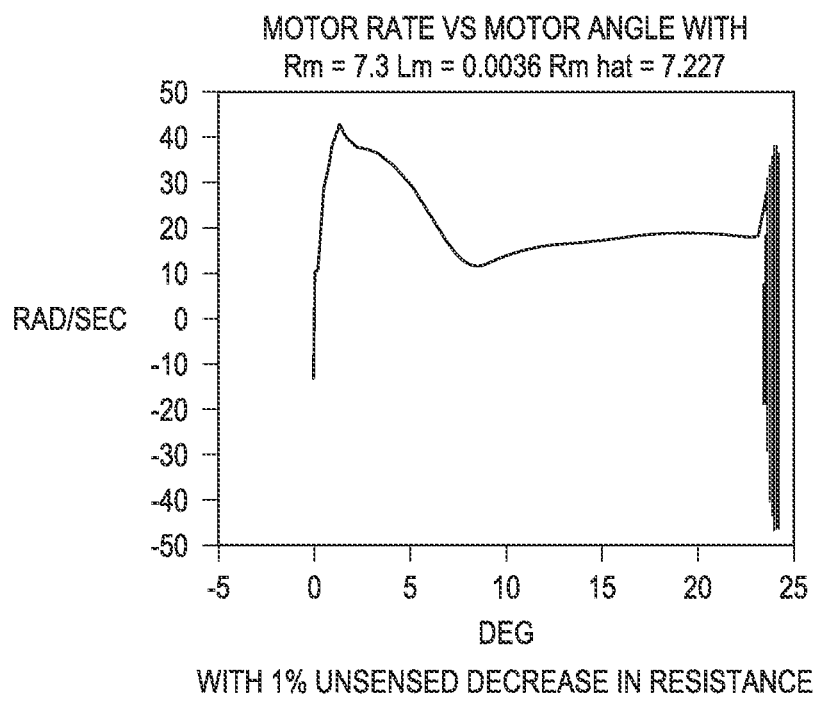
FIG. 18 illustrates a 1% unsensed decrease.

FIG. 18 illustrates a 1% unsensed decrease in resistance where Rm=7.3, Lm=0.0036 and Rm hat=7.227.

Figure 19:
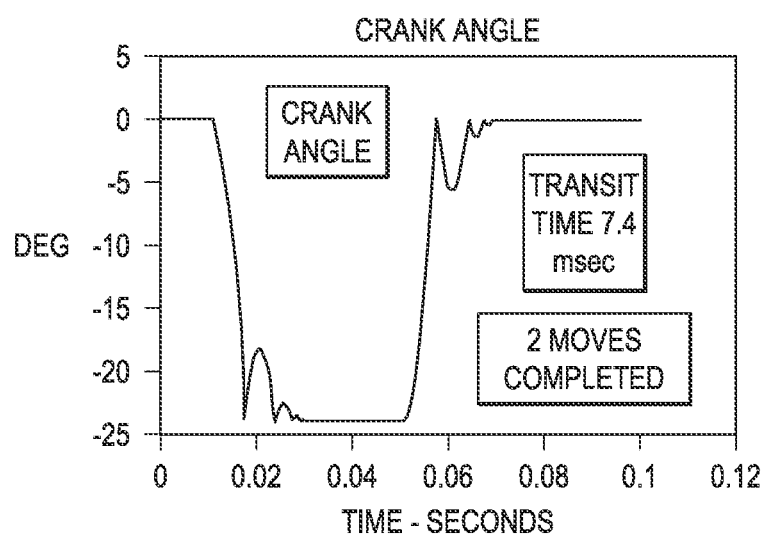
FIG. 19 illustrates a crank angle of the drive crank as a function to time, illustrating transit time between position 1 and position 2 in each direction.

FIG. 19 illustrates crank angle of drive crank 22 as a function to time, illustrating transit time between position 1 and position 2 in each direction.

Figure 20:
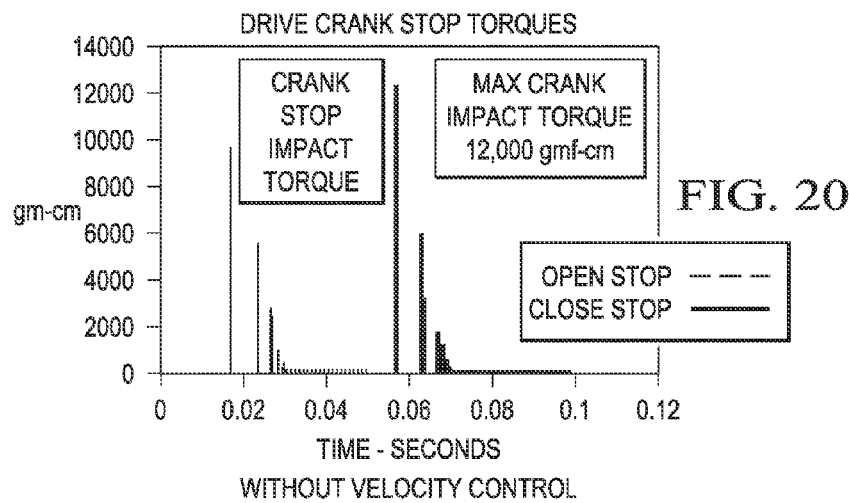
FIG. 20 illustrates crank stop impact torque without velocity control according to the invention.

FIG. 20 illustrates crank stop impact torque without velocity control according to the invention.

Figure 21:
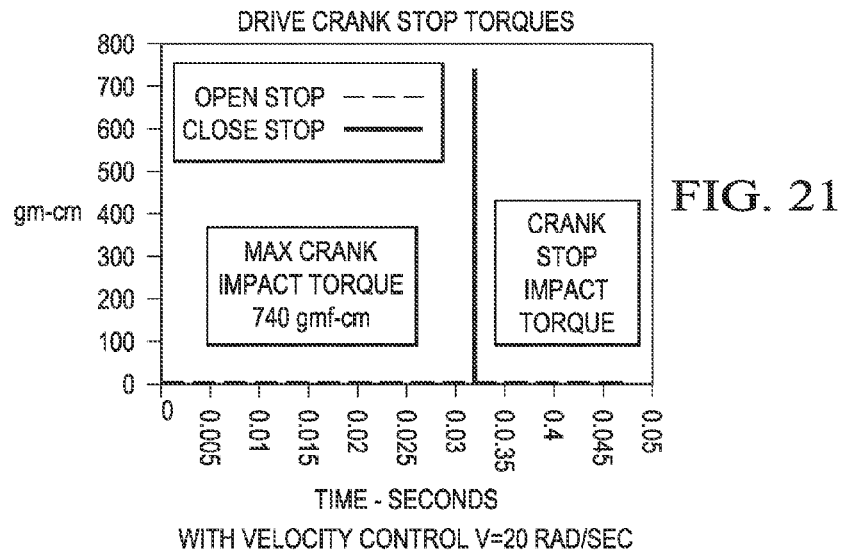
FIG. 21 illustrates crank stop impact torque with velocity control of according to the invention.

FIG. 21 illustrates crank stop impact torque with velocity control of V=20 rad/sec according to the invention.

Figure 22:
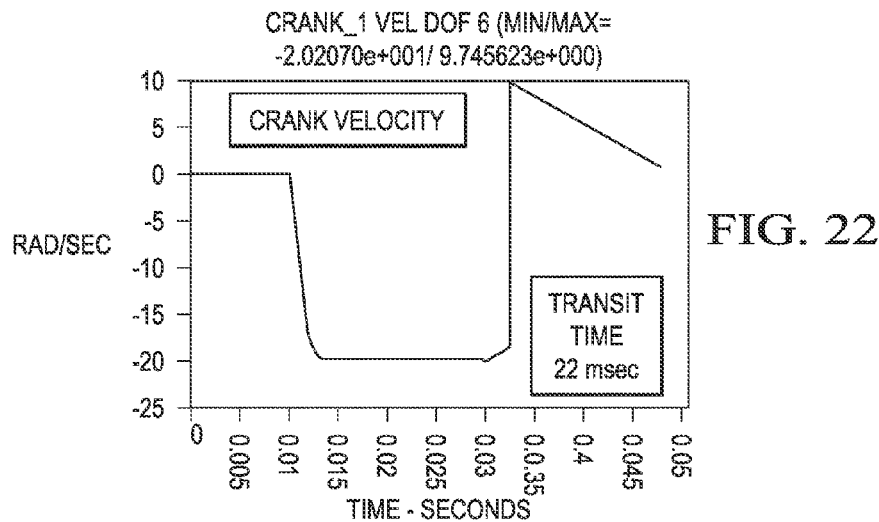
FIG. 22 illustrates the velocity of crank for each transition of the drive crank.

FIG. 22 illustrates the velocity of crank 22 for each transition of the cranks.

Referring now to FIG. 23, there is shown a waveform of a drive signal 70 created by controller 62 and drive electronics 64 configured to drive the rotary motor 18 of each drive mechanism 16A and 16B, and thus position each of arms 24, 42 and 46 of respective drive crank 22 between the respective first position to the second position. The drive signal 70 comprises a pulse width modulated (PWM) signal having a controllable duty cycle being a function of the drive arm 42 position. The position of arm 42 is directly correlated to the position of drive arm 24 because each of arms 42 and 24, as well as arm 46, radially extends from the same drive crank 22. Drive arm 24 controls the position of shutter blades 14 as described above. Thus, detecting the position of drive crank arm 42 also provides detecting the position of the drive arm 24, and detecting the first and second position of arm 42 enables the controller 62 to detect the first and second position of drive arm 24.

In one embodiment of this disclosure, the duty cycle of the PWM signal is established as a function of the drive arm 42 position, the arm 42 having respective magnet 44 as sensed by the respective pair of Hall Effect sensors 40 associated with each arm 42 of drive mechanisms 16A and 16B. The first Hall Effect sensor 40 determines that the arm 42 is in the first position when it detects the magnet 44 of the arm 42, and the second Hall Effect sensor 40 determines that the arm 42 is in the second position when it detects the magnet 44 of arm 42. When neither Hall Effect sensor 40 detects the magnet 44 of the drive arm 42, the controller 62 determines that the drive arm 42 is in transition between the first and second position. It is noted that the Hall Effect sensors 40 have a small range and can detect the arm 42 even when the arm is a short distance from a respective hard stop 54, shown as distance D1 and D2 in FIG. 23.

In the embodiment shown in FIG. 23, the waveform of drive signal 70 has multiple phases generated as a function of the position of the drive arm 42 with respect to the respective Hall Effect sensors 40. The duty cycle of the drive signal 70 may have a first duty cycle during a phase 1, which as shown is when the respective drive arm 42 of drive crank 22 is proximate the hard stop/limit screw 54 of limit member 50 as shown in FIG. 3, and until the respective Hall Effect sensor 40 turns off upon detecting that the magnet 44 of the arm 42 is no longer in the first position and has move a distance D1, toward the second position. The first duty cycle may initially be below a threshold duty cycle required to create sufficient energy to push off the magnetic detent force providing retention of the magnetic detent latch 32 acting against the shutter pin 30. The first duty cycle of the first phase is increased, such as by ramping up, to initiate the release of the shutter pin 30 from the respective detent latch 32 and accelerate and increase the speed of the arm 24. For instance, but without limitation to, the initial PWM signal may have a 50% duty cycle, and which first duty cycle is increased 5% every 4 millisecond to deliver sufficient energy to start the DC solenoid rotary motor 18 into the peak torque region of the motor. The Hall Effect sensors 40 provide a feedback signal to the controller 62 and indicate when the arm 42 is advanced away from the respective Hall Effect sensor 40, from the first position and towards the second position. Alternatively, the first duty cycle of the first phase may be a large with a fixed duty cycle, providing sufficient energy to overcome the magnetic detent forces as described above.

The waveform of drive signal 70 has a second duty cycle during phase 2 that is established by controller 62 after the arm 42 as departed the first position, having traveled distance D1, as established by the Hall Effect sensor 40 proximate the arm no longer detecting the magnet 44 of the arm 42. The second duty cycle of the waveform 70 is reduced from that of the first duty cycle to reduce the amount of energy delivered to motor 18 and thus reduce the speed of the arm 42 into the second position and eventual engagement of the corresponding arm 46 of the crank shaft 22 against hard stop 54 of limit member 52. For instance, the duty cycle during phase 2 may be 20% as established by controller 62. The duty cycle of phase 2 may also be gradually ramped down, such as the arm 46 approaches the second position. Phase 2 ends when the other Hall Effect sensor 40 detects the magnet 44 of arm 42, when the arm 42 is in the second position, and the corresponding arm 46 of the drive crank 22 distance D2 from the hard stop 54 of limit member 52, and just before the arm 46 engages the hard stop 54 of limit member 52, to reduce the impact thereof, and extend the operational life of the mechanisms and reduce bouncing.

A phase 3 of the drive waveform begins when the arm 42 is in the second position, with corresponding arm 46 of the drive crank 22 distance D2 from the hard stop 54 of limit member 52, just before engagement with the hard stop 54 of limit member 52. Phase 3 ends when arm 46 engages the hard stop 54 of limit member 52. Phase 3 of the waveform 70 may have a 0% duty cycle, or a minimal duty cycle being less than 20%. Advantageously, phase 3 provides for arm 46 to coast and create a softer landing when it engages hard stop 54 (reaching an end of travel) than if power to motor 18 was maintained during the entire length of travel. In some embodiments, the waveform is configured to reverse drive the motor to slow down the motor and reduce the impact force when the corresponding arm 46 engages the hard stop 54, or the third phase may be eliminated.

The above described drive signal waveform may also be used to transition the drive arm 42 from the second position back to the first position. The total time for the transitions in each direction may or may not be the same, depending on several factors, such as the physical relationships of the various members and the drive waveforms used. In one preferred embodiment, the time for each arm 42 to transition from the first position to the second position may be 13 milliseconds, and the time for the arm 42 to transition from the second position back to the first position may be 25 milliseconds, although limitation to these times is not to be inferred. Each of these transition times may be selectively established by varying the duty cycle of the drive waveforms as determined by controller 62. For instance, the transition time from the first position to the second position may be reduced by 2 milliseconds if the duty cycle of waveform 70 during Phase 2 is increased to 40%. However, this would increase the impact force when the arm 46 engages the respective stop member 54 of limit member 52. In one preferred embodiment, the amplitude of the drive waveform may be 4 volts but may be higher or lower, and the PWM frequency may be 100 kHz, although this frequency may be higher or lower and limitation to this frequency is not to be inferred.

A wide variety of different phases, and types of operation within the phases, such as steady or varying duty cycles, may be employed. The PWM approach provides essentially an infinitely variable control method for a simple rotary motor, such as a bi-stable solenoid motor. The result is a digitally controlled DC solenoid that manages speed and impact energy at stops that are the extremes of the member travel. The present disclosure is applicable to other drive mechanisms for controllably driving members of apparatuses other than shutter assemblies, and limitation to the particular embodiments of this disclosure is not to be inferred.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A device, comprising:
    a rotary actuated motor configured to rotatably drive a motor member;
    a drive member coupled to the motor member and having a drive arm configured to responsively move from a first position to a second position upon rotation of the motor member;
    a first sensor disposed proximate the first position;
    a second sensor disposed proximate the second position; and
    a drive circuit configured to generate a pulse width modulated (PWM) drive signal to controllably drive the motor, the PWM drive signal having (i) a first duty cycle configured to advance the drive arm from the first position to a first intermediate position between the first position and the second position, the first intermediate position corresponding to an outer edge of a sensing range of the first sensor, (ii) a second duty cycle configured to advance the drive arm from the first intermediate position to a second intermediate position between the first intermediate position and the second position, the second intermediate position corresponding to an outer edge of a sensing range of the second sensor, the second duty cycle different than the first duty cycle, and (iii) a third duty cycle configured to be used as the drive arm approaches the second position from the second intermediate position;
    wherein the drive circuit is configured to gradually increase the first duty cycle over multiple increments to gradually increase a force delivered to the drive member; and
    wherein the drive circuit is configured to establish the first, second, and third duty cycles as a function of at least one output from the first and second sensors.

2. The device as specified in claim 1, wherein:
the first sensor is configured to determine a position of the drive member when the drive arm is proximate the first position; and
the second sensor is configured to determine the position of the drive member when the drive arm is proximate the second position.

3. The device as specified in claim 1, wherein the first duty cycle is greater than the second duty cycle.

4. The device as specified in claim 3, wherein the drive circuit is configured to gradually decrease the second duty cycle over multiple increments to gradually decrease the force delivered to the drive member.

5. The device as specified in claim 4, wherein the drive circuit is configured to establish the PWM drive signal at the third duty cycle when the drive arm reaches the second intermediate position.

6. The device as specified in claim 1, wherein the drive circuit is configured to eliminate the PWM drive signal when the drive arm reaches the second position.

7. The device as specified in claim 1, further comprising:
a hard stop configured to stop movement of the drive member after the drive arm reaches the second position.

8. The device as specified in claim 1, wherein the drive circuit is configured to vary a speed of the drive arm as a function of the drive arm's position with respect to the first position and the second position.

9. The device as specified in claim 1, wherein the first and second sensors comprise magnetic sensors.

10. The device as specified in claim 1, wherein the third duty cycle is less than 20%.

11. The device as specified in claim 1, wherein the drive circuit is configured to initially generate the PWM drive signal at a duty cycle greater than zero but less than a threshold duty cycle required to overcome a magnetic detent force and advance the drive arm from the first position.

12. The device as specified in claim 1, further comprising:
a controller configured to digitally control the motor, the controller being programmable to selectively establish the first duty cycle, the second duty cycle, and the third duty cycle.

13. The device as specified in claim 1, further comprising:
an actuator configured to move in response to movement of the drive arm, wherein the actuator is thermally isolated from the drive arm in both the first position and the second position.

14. The device as specified in claim 13, wherein the drive arm is configured to:
engage and advance the actuator when the drive arm is between the first position and the second position; and
remain physically spaced from the actuator when the drive arm is in the first position and the second position.

15. The device as specified in claim 14, further comprising:
a shutter coupled to the actuator, the shutter configured to have one position when the drive arm is in the first position and another position when the drive arm is in the second position, wherein the shutter is thermally isolated from the drive arm.

16. A device, comprising:
a rotary actuated motor configured to rotatably drive a motor member;
a drive member coupled to the motor member and having a drive arm configured to responsively move from a first position to a second position upon rotation of the motor member;
first and second sensors configured to determine a position of the drive member, the first sensor proximate the first position and the second sensor proximate the second position; and
a drive circuit configured to generate a pulse width modulated (PWM) drive signal to controllably drive the motor, the PWM drive signal having (i) a first duty cycle configured to advance the drive arm from the first position to a first intermediate position between the first position and the second position, the first intermediate position corresponding to an outer edge of a sensing range of the first sensor, (ii) a second duty cycle configured to advance the drive arm from the first intermediate position to a second intermediate position between the first intermediate position and the second position, the second intermediate position corresponding to an outer edge of a sensing range of the second sensor, the second duty cycle different than the first duty cycle, and (iii) a third duty cycle configured to be used as the drive arm approaches the second position from the second intermediate position;
wherein the drive circuit is configured to establish the first, second, and third duty cycles as a function of at least one output from the first and second sensors;
wherein the drive circuit is configured to gradually increase the first duty cycle over multiple increments to gradually increase a force delivered to the drive member; and
wherein the first sensor is configured to turn off upon detecting that the drive arm has moved to the first intermediate position.

17. The device as specified in claim 16, wherein the drive circuit is configured to selectively vary a speed of the drive arm as a function of the drive arm's position with respect to the first position and the second position.

18. The device as specified in claim 16, wherein the drive circuit is configured to gradually decrease the second duty cycle over multiple increments to gradually decrease the force delivered to the drive member.

19. The device as specified in claim 16, wherein the third duty cycle is less than 20%.

20. The device as specified in claim 16, wherein the drive circuit is configured to eliminate the PWM drive signal when the drive arm reaches the second position.

21. The device as specified in claim 16, further comprising:
a hard stop configured to stop movement of the drive member after the drive arm reaches the second position.

22. The device as specified in claim 16, wherein the first duty cycle is greater than the second duty cycle.

23. The device as specified in claim 16, wherein the drive circuit is configured to establish the PWM drive signal at the third duty cycle when the drive arm reaches the second intermediate position.

24. The device as specified in claim 16, wherein the first and second sensors comprise magnetic sensors.

* * * * *